No. 848,570. PATENTED MAR. 26, 1907.
C. B. SCHOENMEHL.
ZINC ELECTRODE.
APPLICATION FILED NOV. 16, 1905.
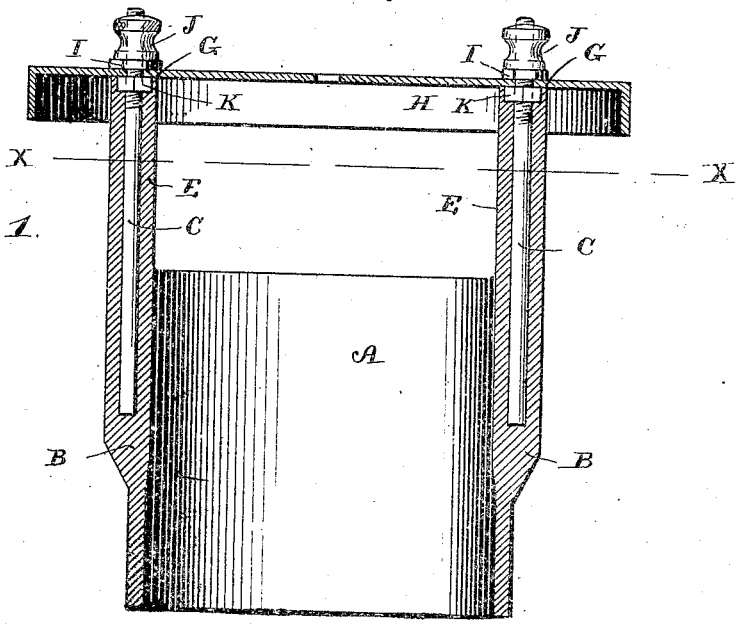
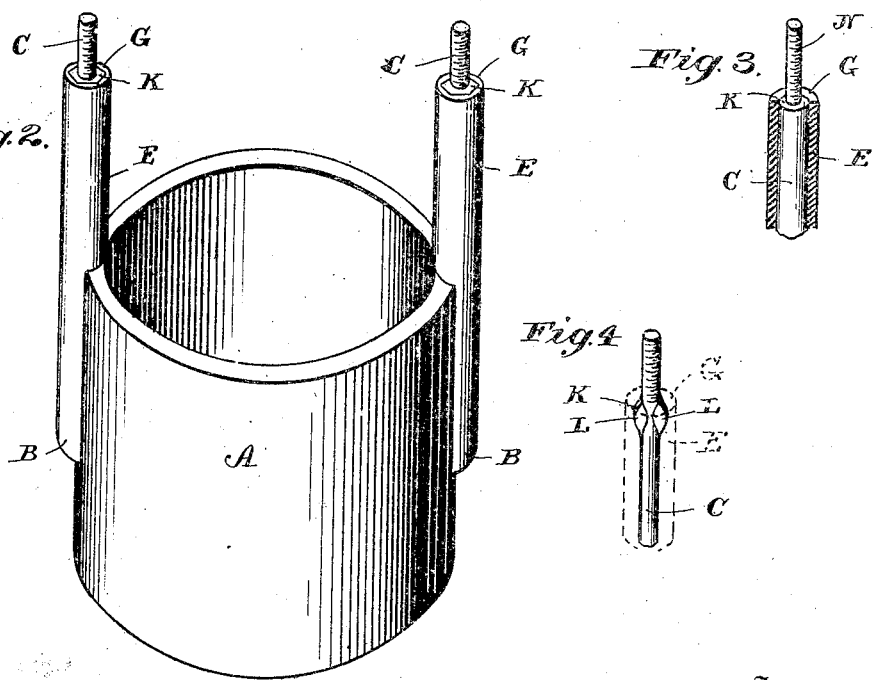
Witnesses
R. H. Newman.
Ruth Raymond.
Inventor
Charles B. Schoenmehl
By Chamberlain & Newman
Attorneys

UNITED STATES PATENT OFFICE.

CHARLES B. SCHOENMEHL, OF WATERBURY, CONNECTICUT.

ZINC ELECTRODE.

No. 848,570.

Specification of Letters Patent.

Patented March 26, 1907.

Application filed November 16, 1905. Serial No. 287,641.

*To all whom it may concern:*

Be it known that I, CHARLES B. SCHOEN-MEHL, a citizen of the United States, and a resident of Waterbury, in the county of New Haven and State of Connecticut, have invented certain new and useful Improvements in Zinc Electrodes, of which the following is a specification.

This invention refers to an improvement in galvanic batteries, and more particularly to an electrode formed of zinc or other material, and is adapted to be used in a jar containing a proper solution in connection with a negative element of any preferred kind.
Zinc electrodes as now found upon the market are made largely in two distinct styles, one being known as a "cylindrical zinc," while the others are commonly called "plates." These different types of zinc are used in different styles of batteries and are adapted to be renewed from time to time as may be required in recharging the battery. The cylindrical types have heretofore been commonly made from sheet-zinc, being first cut to proper form and size and then rolled or bent into cylindrical shape, and to these are attached suitable supporting rods or wires formed of brass or iron, as preferred. These wires have heretofore been attached to the cylinders by first bending the lower end of the wire at substantially a right angle, passing it through a hole in the wall of the zinc, and then riveting it thereto in a way to form a secure engagement. The upper ends of the wires are threaded to receive jam and thumb nuts for attachment to the cover and for the attachment of a conducting-wire. The plate-zincs usually contain but one suspending-rod and are frequently attached to the cover in something the same way as the circular zincs. Both of the above forms of zincs have been found to be objectionable, owing to the exposure of the solution to the suspending-rod between cover and zinc. The differences in the kinds of metal of which the rod and zinc are formed causes local action between the two adjacent to the surface and at the point of union. This local action consumes the abutting surfaces, causing corrosion, thus destroying the contact between the rod and zinc before the latter has been fully consumed.

It is therefore the purpose of this invention to improve upon zinc electrodes of the above classes, and especially the cylindrical zincs above referred to. This I do by first producing a cast zinc adapted to be submerged and having suspending-rods that are reinforced and protected, so as to preclude any contact of solution therefrom, and, further, so as to be stiffened and strengthened; to provide in connection with said reinforced supports a hardened shoulder upon the rod and adjacent to its upper end for the cover of the battery to rest upon and in a way to insure a firm and durable engagement of the rods with the cover, thus preventing the rod and zinc from becoming loose as the reinforced end portion of the zinc becomes soft or eaten away, and, finally, to insure a better conducting medium from the electrode to the binding-post for the circuit-wire.

With the above objects in view my invention resides and consists in the novel construction and combination of parts shown upon the accompanying sheet of drawings, forming a part of this specification, upon which similar characters of reference denote like or corresponding parts throughout the several figures, and of which—

Figure 1 shows a central vertical cross-section through my improved zinc electrode and cover to which it is attached. Fig. 2 is a detached perspective view of my improved electrode complete. Fig. 3 shows a detail perspective sectional view of the upper end of a modified form of supporting-rod. Fig. 4 is a further perspective view of another form of suspending-rod embodying my invention.

Referring in detail to the characters of reference marked upon the drawings, A represents the electrode, which is preferably of a cylindrical construction formed of cast zinc of substantially a uniform thickness throughout, with the exception of the sides B adjoining the suspending-poles. Here the metal is increased in thickness and preferably more pronounced on the exterior than on the interior surface. Rods C C are embedded in these sides, as clearly appears in Fig. 1, and the metal of the electrode is extended up around these rods, as shown by E, above the main body of the electrode, and likewise above the normal line of the solution, as indicated by X in Fig. 1. This metal covering is of substantially a uniform thickness and entirely covers all the portion of the rod C which is designed to be submerged in the solution, thus hermetically sealing the same. The upper ends of these extensions form shoulders G, upon which the cover H for the battery-jar (not shown) rests. The upper portions F of the rods are threaded, as indicated, and upon these threads I provide set-nuts I and a thumb-nut J', the former for the securing of the electrode to the cover and the latter for the attachment of a circuit-wire. (Not shown.)

I have found by practical experience that a shoulder for the cover formed only of the ends of the soft zinc is not sufficiently durable to insure said zinc being firmly retained any considerable length of time, as the said zinc when exposed to the solution and fumes therefrom is liable to corrode and become softened, and thus damaged sufficiently to allow the said zinc to swing and shift about with the jarring of the cell in a way to contact with the coacting element and destroy the efficiency of the battery. I have therefore provided means for forming within the end G of the zinc covering a hardened shoulder K upon the supporting-rods C. This hardened shoulder K may be obtained by the employment of a brass nut, as seen in Figs. 1 and 2, which is run on the threads of the rod before the zinc is cast therearound, or a suitable shoulder can be had by using a slightly heavier rod C and turning off the end N, as seen in Fig. 3. In Fig. 4 a cheaper way of forming this shoulder is shown in the formation of a pair of lugs L, which are thrown out on opposite sides of the brass or iron rod by suitable dies of any ordinary foot or power press. The hardened shoulder K in all instances would obviously be formed or adjusted so as to insure its top face register with the face of the end shoulder G of the zinc reinforcement.

An electrode of this character can be manufactured at a cost not to exceed that of the old type and is much more durable and efficient in its operation. It insures the electrode remaining in a positive fixed position with relation to the cover. It permits the electrode to be entirely submerged and thoroughly protects the suspending-rods, so as to prevent any possible loss of conductivity. It insures an entire consumption of the main body of the zinc, affording a reliable and positive connection with cover to the last, and when recharging becomes necessary can readily be detached and the new electrode applied by simply loosening the thumb and jam nuts, as is apparent.

It will be obvious that my improvements are equally applicable to other forms of zinc electrodes than cylinders, as shown—as for instance, it can be employed in connection with many of the common forms of plate-zincs—and therefore I do not wish to be confined in its application to either the cylinder or plate forms.

Having thus described my invention, what I claim, and desire to secure by Letters Patent, is—

1. An electrode, comprising a zinc having a reduced extension, a suspending-rod embedded in but protruding from said extension, and a hardened shoulder on said rod adjoining the end of the extension to engage the under side of the cover.

2. An electrode, comprising a zinc having a reduced extension, a suspending-rod extended from said extension, and a hardened shoulder upon said rod and embedded in the end of said extension.

3. A battery-electrode, comprising a cylindrical zinc having one or more poles formed integral therewith extended beyond the main body of the zinc, suspending-rods partially inclosed in said poles and zinc in a way to be protected by the same, and hardened shoulders upon the rods to engage the under side of the cover.

4. An electrode, comprising a zinc, a suspending-rod embedded in but protruding from said zinc, a shoulder on said rod to engage a cover, and an extension of said zinc to surround the sides of said shoulder and to also engage said cover.

5. A battery-electrode comprising a zinc containing a suspending-rod embedded therein and having a hardened shoulder adjacent to its upper end, a zinc covering for the lower portion of said rod and shoulder formed integral with said main zinc, said covering being provided with a shoulder at its upper end surrounding the shoulder of the rod and adapted to form a liquid-tight joint with the battery-cover to protect the uncovered portion of said rod from the action of the battery solution.

6. An electrode, comprising a zinc, a suspending-rod embedded in but protruding from said zinc, an annular shoulder upon the rod adjoining the face of the zinc to form a hard engaging surface.

7. An electrode, comprising a zinc, a suspending-rod embedded in but protruding from said zinc, and a shoulder on said rod adjoining the face of the zinc to form a hard engaging surface.

8. An electrode, comprising a zinc having a reduced extension, a suspending-rod embedded in but protruding from said extension and an integral annular shoulder upon the rod adjoining the face of the zinc to form a hard engaging surface for the cover.

Signed this 15th day of November, A. D. 1905.

CHARLES B. SCHOENMEHL.

Witnesses:
C. M. NEWMAN,
R. E. HALL.